UNITED STATES PATENT OFFICE

2,330,722

CONDENSATION PRODUCT AND METHOD OF PREPARING AND USING SAME

Eugene Lieber, Staten Island, N. Y., assignor to Standard Oil Development Company, a corporation of Delaware No Drawing. Application August 24, 1940
Serial No. 354,143

16 Claims. (Cl. 252—52)

This invention relates to a novel type of chemical condensation product and to methods of preparing such products and using them for various purposes, more particularly as pour depressors in waxy lubricating oils.

Broadly, the invention comprises the production of wax modifying agents by chemically condensing an aralkyl halide with an alkaryl hydroxy compound. This condensation is preferably carried out by the use of a Friedel-Crafts catalyst according to a procedure commonly used for effecting such condensations.

The aralkyl halide to be used is preferably one having the general formula $ArRX_p$, in which Ar represents an aromatic nucleus, R represents an aliphatic hydrocarbon group preferably containing less than 7 carbon atoms, and preferably a saturated aliphatic group, and X represents a halogen, $p$ indicating the number of such halogen atoms present, which is preferably from 1 to 3. It is preferred to use monoalkyl substituted aromatic hydrocarbons containing 1 to 3 chlorine atoms in the alkyl group, and the chlorine atoms are preferably attached to the aliphatic carbon atom most remote from the aromatic nucleus. Examples of suitable aralkyl halides are:

Benzyl chloride $C_6H_5CH_2Cl$
Benzal chloride $C_6H_5CHCl_2$
Benzo-trichloride $C_6H_5CCl_3$
Chlormethylnaphthalene $C_{10}H_7CH_2Cl$
Chlormethyl anthracene $C_{14}H_9CH_2Cl$
Chlormethyl diphenyl $C_{12}H_9CH_2Cl$
Chlormethyl xylene $C_8H_9CH_2Cl$ and so forth.

The alkaryl hydroxy compound to be used should preferably be one having the general formula $R'_nAr'OH_m$, in which R' represents an aliphatic hydrocarbon group, $n$ indicating the number of such groups present, said groups being attached to the aromatic nucleus Ar', to which the OH group is directly attached, and $m$ is an integer of 1 to 3. The group R' is preferably saturated, e. g., an alkyl group, and preferably contains 5 to 10 carbon atoms if only one such group is present; whether there are one or more groups, the R' compound should preferably contain a total of from 5 to 20 aliphatic carbon atoms. In case the aromatic nucleus Ar' is mono-nuclear and only one hydroxy group is present, the compounds would be termed "alkyl phenols," and such compounds are preferred. It is also possible to use, however, compounds in which the aromatic nucleus is poly-nuclear having 2, 3 or more aromatic rings, in which the rings may either have two or more carbon atoms in common as in the case of naphthalene, anthracene, and so forth, or not, as in the case of diphenyl and the like. The one or more aliphatic hydrocarbon groups and hydroxy groups may be in various positions in respect to each other around the aromatic nucleus Ar'; but if there is but one hydroxy group and one aliphatic hydrocarbon group, it is preferred that they be in para position to each other. Specific examples of suitable alkaryl hydroxy compounds are:

Tertiary amyl phenol $C_5H_{11}$—$C_6H_4$—OH
Di-amyl phenol $(C_5H_{11})_2C_6H_3OH$
Di-isobutyl phenol $C_8H_{17}$—$C_6H_4$—OH
Amyl-beta-naphthol $C_5H_{11}$—$C_{10}H_6$—OH
Di-isobutyl cresol $C_8H_{17}(CH_3)C_6H_3$—OH In carrying out the condensation, it is preferred to use a Friedel-Crafts catalyst, preferably anhydrous aluminum chloride, although other Friedel-Crafts catalysts can be used, such as, boron fluoride, zinc chloride, ferric chloride, titanium tetrachloride, boron trichloride and in some cases even anhydrous hydrogen fluoride.

The proportions in which the reactants should be used are preferably ½ to 3 moles of the alkaryl hydroxy compound to one mole of the aralkyl halide, and preferably 1 to 2 moles of the alkaryl hydroxy compound to one mole of the aralkyl halide. The amount of catalyst to be used may vary over a fairly wide range, depending partly upon the nature and amount of the reactants as well as partly on the temperature and time of the reaction, but usually it should be about .05 to 1.0 mole, preferably 0.1 to 0.5 of a mole.

In carrying out the invention, the reaction temperature should be maintained between the approximate limits of room temperature and about 300° F. It is preferred to add the catalyst to the reactants gradually at room temperature and then to heat the reaction mass to a temperature of between about 150° to 250° F. and to maintain it there for a sufficient length of time such as ½ to 10 hours, preferably 1 to 5 hours, to produce the desired product. The condensation is preferably carried out in the presence of an inert solvent, such as a highly refined naphtha or kerosene, tetrachlorethane, carbon disulfide, and so forth, although in some cases it is not necessary to use a solvent. After the reaction has been completed, which may in many cases be judged by the approximate cessation of the evolution of hydrogen chloride, the reaction mixture is cooled and diluted with an inert diluent, such as a refined kerosene, and neutralized by any of the known methods, such as by using a mixture of water and alcohol. The kerosene extract is allowed to settle and the aluminous layer drawn off and discarded. The kerosene extract is now filtered from a small quantity of soluble-rubber polymer, the formation of which is due to a side reaction which takes place whereby the benzyl halide combines with itself. The extent of this reaction is very small and does not detract greatly from the yield of the desired product of this invention. The kerosene extract after filtration is distilled to remove the solvent and low boiling products, this distillation being preferably carried out under vacuum or with fire and steam.

After cooling, the reaction mixture was diluted with 500 cc. further of kerosene and neutralized by pouring into a mixture of water and isopropyl alcohol. After settling, the aqueous layer was removed and discarded. The kerosene extract was filtered free of rubbery polymer and then distilled with fire and steam to 600° F. to remove solvent and low-boiling products. A bottoms residue comprising 39 grams of a brownish wax-like solid was obtained as product.

A number of other tests were made using more or less the same general procedure as that described above in the example, except that different reactants were used, in some cases different amounts of reactions or catalyst, and so forth. The results of these tests, together with those of the example, are summarized in the following table.

*Table*

| Test No. | Aralkyl halide | | Alk-aryl OH compounds | | Cat., AlCl, grams | Solvent | | Temp., °F. | Time | Yield, grams | Product °F. pour point per cent addition | |
|---|---|---|---|---|---|---|---|---|---|---|---|---|
| | Name | Grams | Name | Grams | | Name | Cc. | | | | 1 | 2 |
| 1 | Benzyl chloride | 63 | Tert. amyl phenol | 82 | 5 | Kerosene | 200 | 200 | 2 | 39 | −5 | −10 |
| 2 | do | 63 | do | 82 | 10 | do | 200 | 200 | 2 | 48 | | −20 |
| 3 | do | 63 | do | 82 | 30 | do | 200 | 200 | 2 | 32 | −5 | −10 |
| 4 | do | 63 | Di-amyl phenol | 117 | 5 | Tetrachlorethane | 200 | 200 | 2 | 48 | | −10 |
| 5 | Benzal dichloride | 80 | Ter. amyl phenol | 82 | 20 | do | 200 | 200 | 3 | 93 | 0 | −15 |
| 6 | do | 80 | do | 82 | 30 | do | 200 | 200 | 3 | 77 | | −25 |
| 7 | do | 80 | do | 82 | 20 | do | 200 | 200 | 3 | 37 | −10 | −20 |
| 8 | do | 40 | do | 82 | 5 | do | 200 | 200 | 3 | 59 | | −25 |
| 9 | do | 40 | do | 82 | 5 | Kerosene | 200 | 200 | 3 | 65 | −10 | −25 |

The condensation product of this invention is soluble in mineral lubricating oils and is substantially non-volatile at about 600° F., having a fairly high molecular weight. In most cases it is a dark, usually brown, solid having from a wax-like to a brittle resinous texture. Although the chemical structure of these products has not been ascertained definitely, it is believed that they are aralkylated phenols.

The product of this invention has the property of modifying the crystal structure of waxes such as paraffin wax present when added to compositions containing the same. For instance, when about .05–10.0%, preferably −2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc. or for making various molded products.

For the sake of illustration, but without limiting the invention to the particular materials used, the following experimental data are given:

EXAMPLE 63 grams of benzyl chloride and 82 grams of tertiary-amyl phenol were dissolved in 200 cc. of kerosene used as solvent. 5 grams of anhydrous AlCl₃ were added over a period of 20 minutes with suitable agitation. After the addition of the AlCl₃ the reaction mixture was heated to 200° F. and maintained thereat for 2 hours.

The products obtained in tests 1 to 4 were all brown, wax-like solids, whereas those obtained in tests 5 to 9 were all brown or dark-brown, brittle resin-like solids.

It is noted from the pour point data in the above table that an addition of one or two percent of the wax modifier of this invention reduced the pour point of a waxy mineral lubricating oil having an original pour point of 30° F. down to various temperatures ranging from 0° F. to −25° F., thus indicating that potent pour depressors can be produced from materials not heretofore known to be capable of being converted into pour depressors.

It is not intended that this invention be limited to any of the specific examples which were given merely for the sake of illustration nor to any theory as to the mechanism of the operation of the invention but only by the appended claims in which it is intended to claim all novelty inherent in the invention as broadly as the prior art permits.

I claim:

1. A wax modifier consisting essentially of a condensation product of an aralkyl halide having less than 7 alkyl carbon atoms, and an alkaryl hydroxy compound having about 5 to 20 aliphatic carbon atoms, said product being substantially non-volatile under fire and steam distillation up to about 600° F., soluble in mineral oils and having the property of depressing the pour point of waxy mineral oils when added thereto in small amounts.

2. A wax modifier consisting essentially of a condensation product of a mono-alkyl substituted aromatic hydrocarbon containing 1 to 3 chlorine atoms in the alkyl group, and an alkyl phenol, said product being substantially non-volatile under fire and steam distillation up to about 600° F., soluble in mineral oils and having the property of depressing the pour point of waxy mineral oils when added thereto in small amounts.

3. A wax modifier consisting essentially of a condensation product of a chlorine substituted toluene having less than 3 chlorine atoms and less than 7 carbon atoms attached to the aliphatic carbon atom, and an alkyl phenol, said product being substantially non-volatile under fire and steam distillation up to about 600° F., soluble in mineral oils and having the property of depressing the pour point of waxy mineral oils when added thereto in small amounts.

4. A wax modifier consisting essentially of an oil-soluble, brown, wax-like solid condensation product of benzyl chloride, and tertiary amyl phenol, said product being substantially non-volatile under fire and steam distillation up to about 600° F., soluble in mineral oils and having the property of depressing the pour point of waxy mineral oils when added thereto in small amounts.

5. A pour depressor consisting essentially of an oil-soluble, brown, brittle, resinous solid aluminum chloride condensation product of benzal chloride and tertiary amyl phenol, said product being substantially non-volatile under fire and steam distillation up to about 600° F.

6. The process which comprises chemically condensing an aralkyl halide having less than 7 aliphatic carbon atoms and an alkaryl hydroxy compound having at least 5 aliphatic carbon atoms, in the presence of a Friedel-Crafts catalyst, hydrolyzing and removing the catalyst and distilling the reaction products under reduced pressure up to about 600° F. to obtain the desired product as distillation residue.

7. The process of preparing wax modifiers which comprises condensing an aralkyl halide having only one alkyl group, said alkyl group containing less than 7 carbon atoms, and containing 1 to 3 chlorine atoms in said alkyl group, and an alkaryl hydroxy compound having from 5 to 20 aliphatic carbon atoms, in the presence of a Friedel-Crafts catalyst, hydrolyzing and removing the catalyst and distilling the reaction products under reduced pressure up to about 600° F. to obtain the desired product as distillation residue.

8. The process of producing wax-modifiers which comprises condensing one mole of mono-alkyl substituted aromatic hydrocarbon having less than 7 carbon atoms in the alkyl group and containing 1 to 3 chlorine atoms in said alkyl group, with ½ to 3 moles of an alkaryl hydroxy compound having 5 to 20 aliphatic carbon atoms, in the presence of anhydrous aluminum chloride catalyst and at a temperature between approximate limits of room temperature and about 300° F.

9. The process of preparing wax modifiers which comprises condensing approximately equal molar amounts of a chlorine substituted toluene having less than 3 chlorine atoms attached to the aliphatic carbon atom, and an alkyl phenol having at least 5 aliphatic carbon atoms, by making a mixture of said two reactants, adding thereto anhydrous aluminum chloride gradually at room temperature, finally heating the reaction mass to a temperature of about 150° to 250° F. for about ½ to 10 hours, hydrolyzing and removing the catalyst, extracting the reaction product with refined hydrocarbon solvent and distilling said solution with fire and steam to about 600° F. to remove the solvent and low-boiling products and to obtain the desired wax modifier as distillation residue.

10. The process according to claim 9 in which the reactants used are benzyl chloride and tertiary amyl phenol.

11. A composition comprising a major proportion of a hydrocarbon oil and a small amount of a wax modifier dissolving therein consisting essentially of a condensation product of an aralkyl halide having less than 7 alkyl carbon atoms, and an alkaryl hydroxy compound having about 5 to 20 aliphatic carbon atoms.

12. A composition comprising a major proportion of a waxy lubricating oil having dissolved therein a small amount of a pour depressor consisting essentially of a condensation product of a chlorine substituted toluene having less than 3 chlorine atoms attached to the aliphatic carbon atom, and an alkyl phenol having at least 5 aliphatic carbon atoms.

13. A composition according to claim 12 in which the pour depressor is a condensation product of benzyl chloride and tertiary amyl phenol.

14. The process according to claim 12 in which the pour depressor is a condensation product of benzal chloride and tertiary amyl phenol.

15. The process of making lubricating compositions which comprises condensing one mole of a mono-alkyl substituted aromatic hydrocarbon containing less than 7 alkyl carbon atoms and containing 1 to 3 chlorine atoms in the alkyl group, with ½ to 3 moles of an alkaryl hydroxy compound having 5 to 20 aliphatic carbon atoms in the presence of aluminum chloride as catalyst and at a temperature between the approximate limits of room temperature and 300° F. to produce an oil-soluble condensation product substantially non-volatile at 600° F., and having pour depressing properties, and adding a small amount of said pour depressor to a waxy mineral lubricating oil.

16. The process according to claim 15 in which the pour depressor is made by condensation of benzyl chloride and tertiary amyl phenol.

EUGENE LIEBER.